(12) United States Patent
Wahlberg et al.

(10) Patent No.: US 7,930,225 B2
(45) Date of Patent: Apr. 19, 2011

(54) SYNCHRONIZING REAL-TIME AND OFF-LINE ACCOUNTS FOR COMMUNICATIONS

(75) Inventors: Joachim Wahlberg, Bräkne-Hoby (SE); Andreas Abrahamsson, Karlskrona (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 292 days.

(21) Appl. No.: 12/168,083

(22) Filed: Jul. 4, 2008

(65) Prior Publication Data
US 2010/0005012 A1    Jan. 7, 2010

(51) Int. Cl.
*G07B 17/00* (2006.01)
(52) U.S. Cl. ...... 705/30; 455/406; 709/223; 379/121.03
(58) Field of Classification Search ............ 705/30, 705/7; 709/202; 455/406
See application file for complete search history.

(56) References Cited

U.S. PATENT DOCUMENTS

| 6,363,411 | B1 * | 3/2002 | Dugan et al. | 709/202 |
|---|---|---|---|---|
| 2008/0126145 | A1 * | 5/2008 | Rackley, III et al. | 705/7 |
| 2009/0119190 | A1 * | 5/2009 | Realini | 705/30 |
| 2009/0209229 | A1 * | 8/2009 | Cai et al. | 455/406 |

FOREIGN PATENT DOCUMENTS
EP    0 876 045 A1    11/1998

OTHER PUBLICATIONS

International Search Report mailed Oct. 23, 2009 in corresponding PCT Application No. PCT/SE2009/050572.
Written Opinion mailed Oct. 23, 2009 in corresponding PCT Application No. PCT/SE2009/050572.
$3^{rd}$ Generation Partnership Project; Technical Specification Group Services and System Aspects; Telecommunication Management; Charging Management; Charging Architecture and Principles (Release 8) 3GPP TS 32.240 v8.3.0 (Jun. 2008).
$3^{rd}$ Generation Partnership Project; Technical Specification Group Services and System Aspects; Telecommunication Management; Charging Management; Online Charging System (OCS); Application and Interfaces; (Release 8) 3GPP TS 32.296 v8.2.0 (Jun. 2008).
$3^{rd}$ Generation Partnership Project; Technical Specification Group Services and System Aspects; Telecommunication Management; Charging Management; Charging Data Record (CDR) Parameter Description; (Release 8); 3GPP TS 32.298 v8.2.0 (Jun. 2008).

* cited by examiner

*Primary Examiner* — Vanel Frenel
(74) *Attorney, Agent, or Firm* — Nixon & Vanderhye, P.C.

(57) ABSTRACT

Synchronization is provided between a real-time charging system (22) and an off-line billing system (24) of a communications network. The synchronization is facilitated by the real-time charging system (22) preparing a reporting record which includes information comprising: (1) an accumulated cost parameter associated with the event; (2) the real-time account balance, the real-time account balance reflecting the accumulated cost parameter; and (3) a transaction identifier associated with the event. The reporting record (40) is processed by the off-line billing system (24) so that the balances of a real-time account (34) and a off-line account (54) for a subscriber and be compared and, if necessary, adjusted, or other actions taken.

23 Claims, 4 Drawing Sheets

SYNCHRONIZING REAL-TIME AND OFF-LINE ACCOUNTS FOR COMMUNICATIONS

TECHNICAL FIELD

This invention pertains to communications, and particularly to methods and apparatus for accounting and/or charging for services rendered by communications companies and utilized by communication customers.

BACKGROUND

Communications companies (e.g., telecommunications operators) issue financial charges to customers in return for services rendered. The revenue realized by communications companies upon customer payment (whether in advance or after service) defrays, among other things, the initial capital outlay and maintenance of the network infrastructure, as well as day-to-day operating costs.

Some customers may pay a flat fee for communications services. But most customers have an account, established, e.g., via a contract or fee arrangement, which is structured or arranged, at least in part, so that the customer is assessed a communications fee which is dependent upon an amount of time or other network resource which is utilized by the customer (e.g., degree or quality of service, calendar or clock time of service, for example). The fee or charge typically either reduces a prepaid amount existing in the customer's account, or accumulates against the credit of the customer and is presented for subsequent payment.

Billing and/or charging which is dependent upon resource utilization imposes significant structural and informational requirements. For example, for charging purposes the communications network faculties or nodes involved in setup or administration of the services (e.g., of a call or connection) must provide some type of monitoring of resource consumption by multitudinous customers, many of whom are engaged in diverse types of calls or resource utilization activities. The resource monitoring and/or other types of reports must somehow be communicated to a billing system maintained by the communications operator. The signaling and information flow involved in such billing interactions between communications network nodes and the billing system are complex, and accordingly can be susceptible to inefficiencies and potential inaccuracies.

Billing systems connected to communications equipment are generally quite flexible, often involving large computer or data processing sites or nodes. But communications billing services lack the capability to provide real-time credit control (to protect the operator from credit losses) and real-time spending control (to protect the end-user from over spending). The lack of real-time control results, at least in part, from the fact that the communications billing systems generally only act upon historical records received from the communications equipment.

Billing systems essentially build a subscriber account balance based on historical data records received from the communications system and/or charging system. This historical data is typically sent to the billing system in Call Detail Record (CDR) files. This historical data is used by the billing system to form itemized invoices and itemized usage data statements ("bills"). However, the billing system lacks the ability to handle the balance and usage in real-time. This is particularly problematic in the event that CDRs sent from the telecom/charging system get lost before they reach the billing system, or arrive late, in which case the billing system account would not accurately reflect the resources actually utilized by the customer.

Typically the charging system connected to a communications system uses real-time interfaces to build the subscriber account balance in real-time and does not have to rely on historical data records. On the other hand, the charging system lacks the benefit of handling itemized invoice/usage statements, since historical data is not stored within the real-time charging system.

Problems can result since the charging system of the communications network does not have both real-time and historical perspectives. For example, when a subscriber uses his/her phone (for, e.g., speech, short message service (SMS), or other service), the communications network sends a request in real-time to the charging system for credit/spending control to decide if usage by the customer is currently allowed. If usage is allowed, the charging system reserves money (or other units) and sends an acknowledgment back to the communications system. After the usage starts, intermediate charges are levied periodically during the usage as the charging system sends CDRs to the billing system. At end of usage, e.g., at the end of a connection or call, a final charge is determined by the charging system and sent as a CDR to the billing system. Thus, in conjunction with (e.g., after) each intermediate and/or final charge a CDR is produced in charging system and sent to the billing system.

As mentioned above, the CDRs are forwarded to the billing system. In some cases a CDR might get lost before it reaches the billing system. In case of a lost CDR, the billing system has no receipt regarding usage for the particular event covered by the lost CDR. Thus, when a CDR is lost the real-time account (maintained by the charging system) and the offline account (maintained by the billing system) are out of synchronization. Since, on the one hand, the real-time credit and spending control is based on real-time account balance, but on the other hand the invoice/usage statement is based on the offline account balance, there is a misalignment of the real-time credit/spending control with the credit/spending amount on invoice/usage statement.

SUMMARY

The present technology provides synchronization of real-time charging system and an off-line billing system of a communications network which facilitates, e.g., combination of real-time credit & spending control with itemizing invoicing for post-paid customers/subscribers, and itemized usage and accounting for pre-paid customers.

In one of its aspects the technology involves a method of operating a communications network which comprises the real-time charging system and the off-line billing system. Basic acts or steps performed by/at the real-time charging system comprise maintaining a real-time account balance for a subscriber and preparing a record for forwarding to an off-line billing system for a communications event involving the subscriber. The record is prepared to include information comprising: (1) an accumulated cost parameter associated with the event; (2) the real-time account balance, the real-time account balance reflecting the accumulated cost parameter; and (3) a transaction identifier associated with the event.

Basic acts or steps performed by/at the at the billing system comprise maintaining an off-line account balance for the subscriber and, upon receipt of the record, re-computing the off-line account balance for the subscriber to obtain a recomputed off-line balance for the subscriber which reflects the accumulated cost parameter. The billing system further performs a comparison of the recomputed off-line account balance with the real-time account balance. The billing system performs an action based on the comparison. The notification can result in one or more actions being performed, such as (for example) adjusting the balance of the real-time account; adjusting the balance of the off-line account; generating an alarm; recording or relaying any discrepancy noted in the comparison to a log or other media; and/or providing a notification (that can be followed by or result in performance of such actions).

In an example mode, the comparison action can be performed upon occurrence of predefined synchronization criteria. Examples of such predefined synchronization criteria include at bill run (bill generation) or pre-defined time & date (e.g., at 01:00 AM every day).

In an example mode, the charging system prepares the transaction identifier in accordance with a predefined convention, and the billing system uses the transaction identifier to ascertain loss of a previous record.

The reporting record can be prepared in accordance with any suitable record-triggering criteria, with the result that a reporting record can be prepared and sent to the billing system upon occurrence of a final charging instance of the event or occurrence of an intermediate charging instance (e.g., any non-final charging instance) of the event.

The acts or steps of the example method are performed for plural events occurring either at the same or different times. That is, both the off-line account balance and the real-time account balance are maintained as multi-event and multi-transaction account balances for the subscriber.

In another of its aspects, the technology concerns a node of a communications network which serves as the real-time charging system. The real-time charging system node comprises a database configured to maintain a real-time account balance for a subscriber and a reporter unit. The reporter unit is configured, in conjunction with a communications event involving the subscriber, to prepare a record for forwarding to an off-line billing system. The record is configured to include information comprising: (1) an accumulated cost parameter associated with the event; (2) the real-time account balance, the real-time account balance reflecting the accumulated cost parameter; and (3) a transaction identifier associated with the event.

In another of its aspects, the technology concerns a node of a communications network which serves as the off-line billing system. The off-line billing system nodes comprises a database configured to maintain an off-line account balance for a subscriber and a report processor. The report processor analyzes the reports generated by the real-time charging system and comprises a balance computer and an account checker. The balance computer is configured, upon receipt of a charging record, to re-compute the off-line account balance for the subscriber to obtain a recomputed off-line balance. As indicated above, the charging record includes information comprising: (1) an accumulated cost parameter associated with a real-time communications event involving the subscriber; (2) a real-time account balance for the subscriber; and (3) a transaction identifier associated with the event. The account checker is configured to perform a comparison of the recomputed off-line account balance with the real-time account balance. The off-line billing system further comprises a responder configured to perform an action based on comparison.

In an example embodiment, the account checker is configured to perform the comparison upon occurrence of pre-defined synchronization criteria.

In an example embodiment, the off-line billing system further comprises a lost record detector configured to use the transaction identifier to ascertain loss of a previous record.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed.

Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 1:
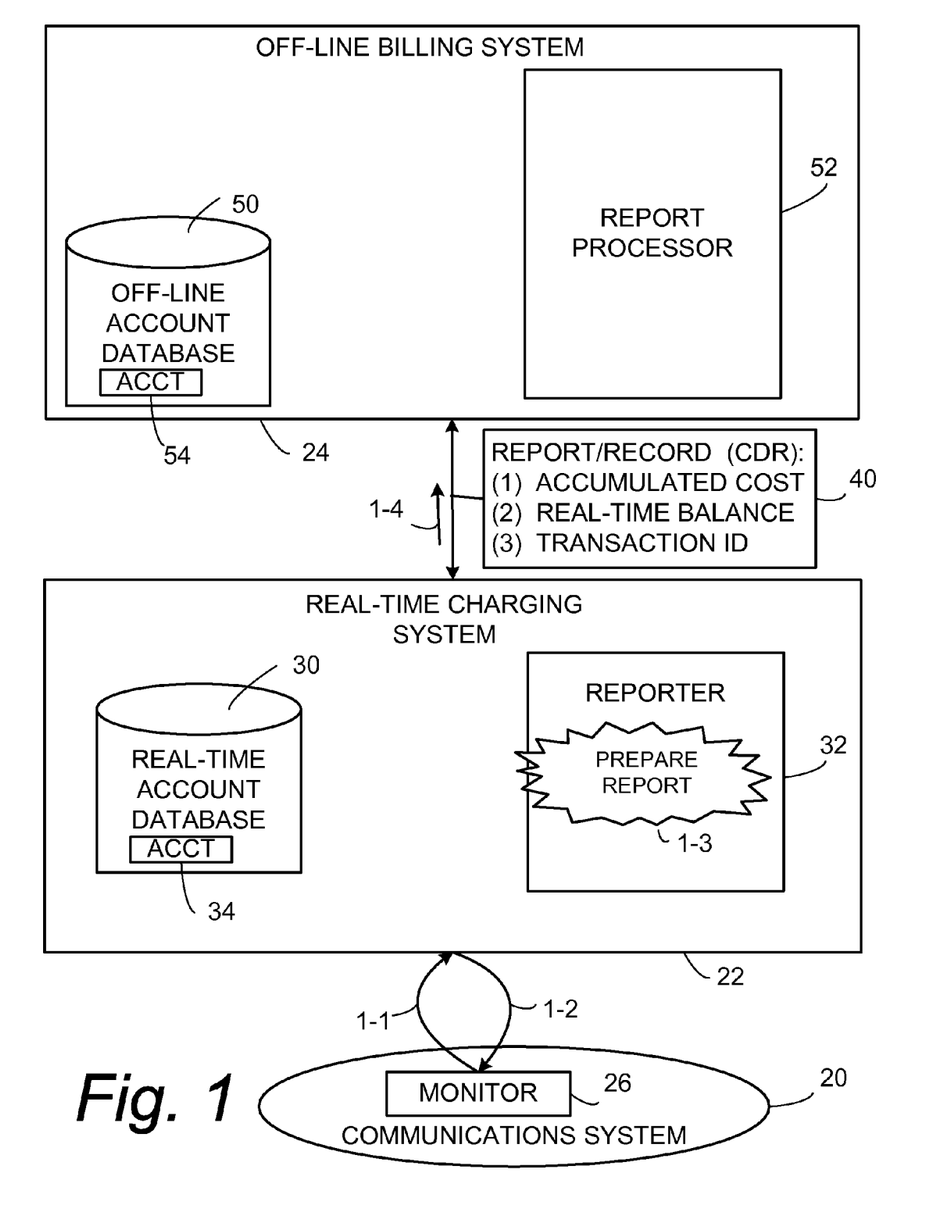
FIG. 1 is a diagrammatic view of an example communications network comprising example, representative, generic embodiments of a charging system and a billing system.

FIG. 1 shows an example communications network comprising a communications system 20 which has access to a real-time charging system 22 and an off-line billing system 24. The communications system 20 can be or comprise any type of radio access network or other type access network, alone or in combination with one or more core networks, and is typically provided and/or maintained, or is available for use, by a communications company or communications operator which provides services to customers or subscribers in exchange for payment. Thus, the communications system 20 can comprise or encompass a telecommunications system or network. For example, communications system 20 can thus comprise or encompass a network of a type known as the Universal Mobile Telecommunications (UMTS) Terrestrial Radio Access Network (UTRAN), a Global System for Mobile communications (GSM) type network, an Advance Mobile Phone Service (AMPS) type system; a Narrowband AMPS type system (NAMPS); a Total Access Communications type system (TACS); a Personal Digital Cellular (PDS) type system, an EDGE system, just to name a few different types of radio access networks. The communications system 20 is not limited to wireless communication system but may be any type of, or combination, of data and/or communication systems as fixed line communication networks, IP Multimedia Subsystem (IMS), WLAN, Diameter/Content/Service delivery as specified by 3GPP.

The real-time charging system 22 and off-line billing system 24 can, at least in some embodiments, comprise or be included in nodes or elements of communications system 20, but as shown in FIG. 1 are typically situated at nodes or service points which are external to communications system 20. As used herein, a service point or any other site or facility which performs the functions herein described for either real-time charging system 22 or off-line billing system 24 are included in the concept of "node", whether such node or service point is dedicated for the charging/billing function or happens to perform functions in addition to the charging/billing function. Appropriate signaling connections and signaling protocols are established between communications system 20 and real-time charging system 22, as well as between real-time charging system 22 and off-line billing system 24.

FIG. 1 illustrates generically (by communications activity monitor 26) a capability of communications system 20 to monitor communications activity, e.g., calls and connections involving subscribers, and to obtain and/or signal information to real-time charging system 22 with respect to such activity. Thus, the communications activity monitor 26 communicates with real-time charging system over an appropriate link and protocol. The communications activity monitor 26 is configured to consult real-time charging system 22 and/or off-line billing system 24 upon attempted set up of a call or connection (e.g., a transaction) involving a subscriber, and upon approval and successful set up to provide to real-time charging system 22 and/or off-line billing system 24 information germane to a subscriber's account. Such information can be generated by communications activity monitor 26, not only upon set up of a connection, but also at termination of the call or connection as well as intermediate points in between. The information can pertain to duration or time of the call or connection, and can also describe other aspects or parameters of the call of connection, such as type of service provided, quality of service provided, number of services (e.g., SMS), number of events/units etc. Of course, communications activity monitor 26 provides its information for multitudinous subscribers, and for repeated calls or connections of such subscribers on an on-going basis. The communications activity monitor 26 thus typically represents numerous reporting agents comprising or interspersed within communications system 20, which can be situated at various locations throughout communications system 20. Alternatively, at least in some embodiments, some or all functions of communications activity monitor 26 can also be considered part of real-time charging system 22.

A generic, representative, real-time charging system 22 as shown in FIG. 1 comprises real-time account database 30 and a reporter unit, also termed the "reporter" 32. Real-time account database 30 is configured to maintain a real-time account and thus a real-time account balance for a subscriber. The real-time account balance for a subscriber is depicted by real-time account 34 in FIG. 1. It will be appreciated that the real-time account database 30 of real-time charging system 22 comprises accounts for myriad subscribers, of which real-time account 34 is just one convenient example.

Although not shown in FIG. 1, real-time charging system 22 can be connected or situated to receive roaming data or data from other devices, such as a mediation device, for example. Such data (e.g., roaming data or data received via a mediation device) is usually received over an offline interface, e.g., a call detail record (CDR)-based interface. By contrast, the interface between real-time charging system 22 and communications system 20 is an online (e.g., real time) interface.

Reporter 32 is configured, in conjunction with a communications event involving the subscriber, to prepare a record for forwarding to off-line billing system 24. The event can be a transaction such as a call or connection. The real-time charging system 22, and thus reporter 32, becomes aware of the event, by receiving notification(s) from communications activity monitor 26. The communications activity monitor 26 can provide notifications concerning the event at various instances, such as (for example) a final charging instance of the event or at occurrence of an intermediate charging instance (e.g., any non-final charging instance) of the event.

An example such record is shown as in FIG. 1 as a report or record 40 (which can be a call detail record (CDR)). Typically a call detail record CDR can be either of two types, rated or unrated. A "rated" CDR includes a cost; an "unrated" CDR is a CDR that includes data by which the service can be rated, but the rating has not been made. As explained herein, record 40 is configured by reporter 32 to include information comprising: (1) an accumulated cost parameter associated with the event; (2) the real-time account balance, the real-time account balance reflecting the accumulated cost parameter; and (3) a transaction identifier associated with the event.

A generic, representative, off-line billing system 24 as shown in FIG. 1 comprises off-line account database 50 and report processor 52. Off-line account database 50 is configured to maintain an off-line, non-real-time account and thus an off-line account balance for a subscriber. The off-line account balance for a subscriber (associated with real-time account 34) is depicted by off-line account 54 in FIG. 1. It will again be appreciated that off-line account database 50 of off-line billing system 24 comprises accounts for myriad subscribers, of which off-line account 54 is just one example.

Report processor 52 analyzes the reports generated by the real-time charging system 22 and upon receipt of a charging record, re-computes the off-line account balance for the subscriber to obtain a recomputed off-line balance. Further, the report processor 52 make a comparison of the recomputed off-line account balance with the real-time account balance, and provides a notification based on comparison (particularly if there is a discrepancy between the recomputed off-line account balance with the real-time account balance).

Figure 2:
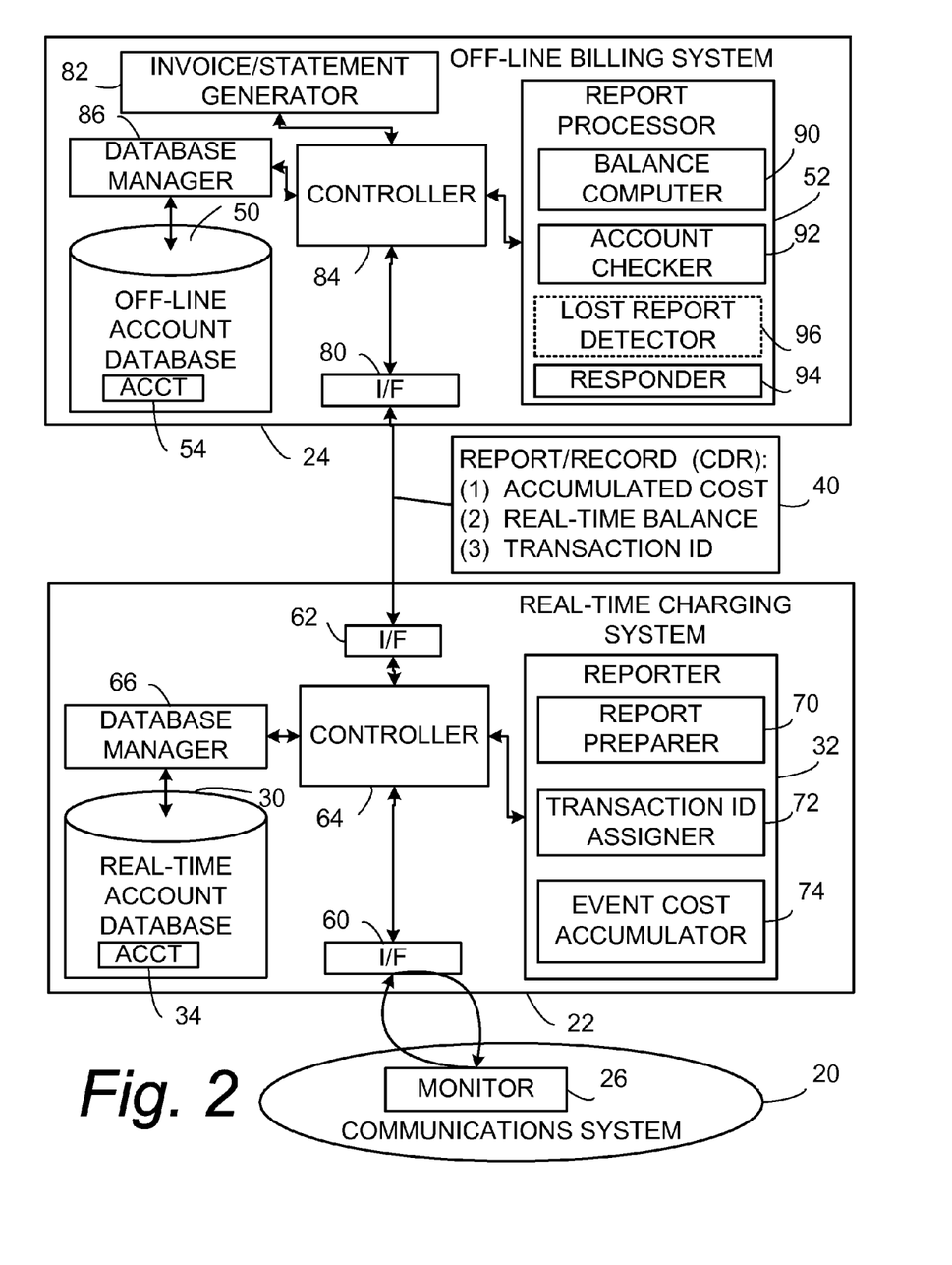
FIG. 2 is a diagrammatic view of an example embodiment of a communications network comprising detailed example embodiments of a charging system and a billing system.

FIG. 2 shows more detailed example embodiments of a real-time charging system 22(2) and an off-line billing system 24(2). In addition to including real-time account database 30 and reporter 32, real-time charging system 22(2) comprises network interface 60, billing system interface 62, controller 64, and database manager 66. The network interface 60 handles signaling and communications with communications system 20, and particularly communications with communications activity monitor 26. The billing system interface 62 handles signaling and communications with off-line billing system 24 on behalf of real-time charging system 22. The database manager 66 supervises and controls accesses and maintenance to real-time account database 30, e.g., the writing, reading, updating, of account records such as the account depicted by real-time account 34, for example. The controller 64 supervises and coordinates activities of real-time charging system 22, including the activities of real-time account database 30 and reporter 32. In addition, controller 64 supervises and coordinates internal and external communications (with real-time charging system 22 through network interface 60 and with off-line billing system 24 through billing system interface 62).

Reporter 32(2) of FIG. 2 is shown in more detail as comprising report preparer 70; transaction ID assigner 72; and event cost calculator 74. The report preparer 70 gathers and formats information for preparing the record 40. Report preparer 70 obtains the accumulated cost parameter associated with the event from event cost calculator 74. For possible multiple charging instances involved in the event, the event cost calculator 74 accumulates or sums the cost of each charging instance of the event. The report preparer 70 obtains the real-time account balance for a subscriber from real-time account database 30. The real-time account balance is updated to reflect the accumulated cost parameter for the on-going event. The report preparer 70 obtains the transaction identifier associated with the event from transaction ID assigner 72. The transaction identifier is prepared by transaction ID assigner 72 in accordance with a predefined convention which can be used by the billing system to ascertain loss of a previous record. For example, the transaction ID assigner 72 can generate or assign sequential type transaction identifiers.

Both database manager 66 and reporter 32 can take the form of a processor or controller as those terms are herein expansively elaborated. Indeed, in at least some embodiments the database manager 66 and the reporter 32 (and its constituent units), as well as real-time account database 30, can be subsumed or included in controller 64. The controllers or units that comprise controller 64, database manager 66, and reporter 32 can be dedicated, shared, or distributed, and can handle other functions in additions to those herein attributed.

In addition to including off-line account database 50 and report processor 52, off-line billing system 24(2) comprises charging interface 80, invoice/statement generator 82, controller 84, and database manager 86. The network interface 60 handles signaling and communications with communications system 20, and particularly communications with communications activity monitor 26. The billing system interface 62 handles signaling and communications with off-line billing system 24 on behalf of real-time charging system 22. The database manager 66 supervises and controls accesses and maintenance to real-time account database 30, e.g., the writing, reading, updating, of account records such as the account depicted by real-time account 34, for example. The controller 64 supervises and coordinates activities of real-time charging system 22, including the activities of real-time account database 30 and reporter 32. In addition, controller 64 supervises and coordinates internal and external communications (with real-time charging system 22 through network interface 60 and with off-line billing system 24 through billing system interface 62).

Report processor 52 of FIG. 2 is shown in more detail as comprising balance computer 90; account checker 92; and responder 94. The balance computer 90 is configured, upon receipt of a charging record 40, to re-compute the off-line account balance for the subscriber and therefore to obtain a recomputed off-line balance. This is possible since, as indicated above, the charging record 40 includes information comprising: (1) an accumulated cost parameter associated with a real-time communications event involving the subscriber; (2) a real-time account balance for the subscriber; and (3) a transaction identifier associated with the event.

The account checker 92 is configured to perform a comparison of the recomputed off-line account balance with the real-time account balance obtained from the charging record 40. This comparison comprises or is part of a "synchronization" operation performed by off-line billing system 24, and by report processor 52 in particular. The synchronization operation, and thus the comparison, can be performed upon occurrence of predefined synchronization criteria. The predefined synchronization criteria can comprise periodic time intervals at which the synchronization should be performed, or other triggering events. The predefined synchronization criteria can be configurable by the operator.

Responder 94 is configured to perform an appropriate action based on the comparison performed by account checker 92. The action performed by 94 can be, for example, one or more or a combination of the following: adjusting the balance of the real-time account; adjusting the balance of the off-line account; generating an alarm; recording or relaying any discrepancy noted in the comparison to a log or other media; providing a notification (that can also result or be followed by one or more of the preceding actions).

In the example embodiment, the off-line billing system further comprises an optional feature of a lost record detector 96. The lost record detector 96 is configured to use the transaction identifier of record 40 to ascertain loss of a previous record.

By introducing the concept of synchronizing the real-time account 54 in real-time charging system 22 with the billing system account 74 in off-line billing system 24, real-time credit & spending control are combined with itemized invoicing for post-paid subscribers, and itemized usage & account statement for pre-paid subscribers. The charging system 22, connected to telecom equipment 20 using real-time interfaces, provides full credit control and spending control by making reservations towards a real-time account before allowing consumption of the service.

To achieve combined real-time credit & spending control for post-paid subscribers with itemized invoice, synchronization is provided between the real-time account balance 34 in the real-time charging system 22 and the offline account balance 54 registered by off-line billing system 24 (e.g. Balance Manager, Billing System or Business Horizontal) which is used to build invoice and statements via invoice/statement generator 82.

As mentioned above, various parameters are included in all records 40 [e.g., Call Detail Records (CDR) and/or logs] that are generated in the real-time system 22 for all events that affect the real-time account balance (including dedicated accounts which are used as sub accounts for dedicated purposes (e.g., SMS) and user accumulators which are used as counters for keeping track of bonuses and promotions). In particular, the record 40 includes (but is not limited to) the parameters discussed below.

A first parameter included in the record 40 is the real-time subscriber account balance after latest account balance change (e.g. due to intermediate charge, final charge, refill, adjustment etc). The subscriber could be either post- or pre-paid.

A second parameter included in the record 40 is the "sum of cost" or "accumulated cost" parameter which holds the total accumulated cost for a particular current event.

A third parameter included in the record 40 is the unique sequential transaction Id (called 'Transaction ID') for this particular event. As indicated above, in embodiments in which lost record detection is implemented, the transaction ID can be assigned by preconvention to facilitate loss detection. For example, the transaction IDs can be unique sequential number or alphanumeric strings.

Figure 3:
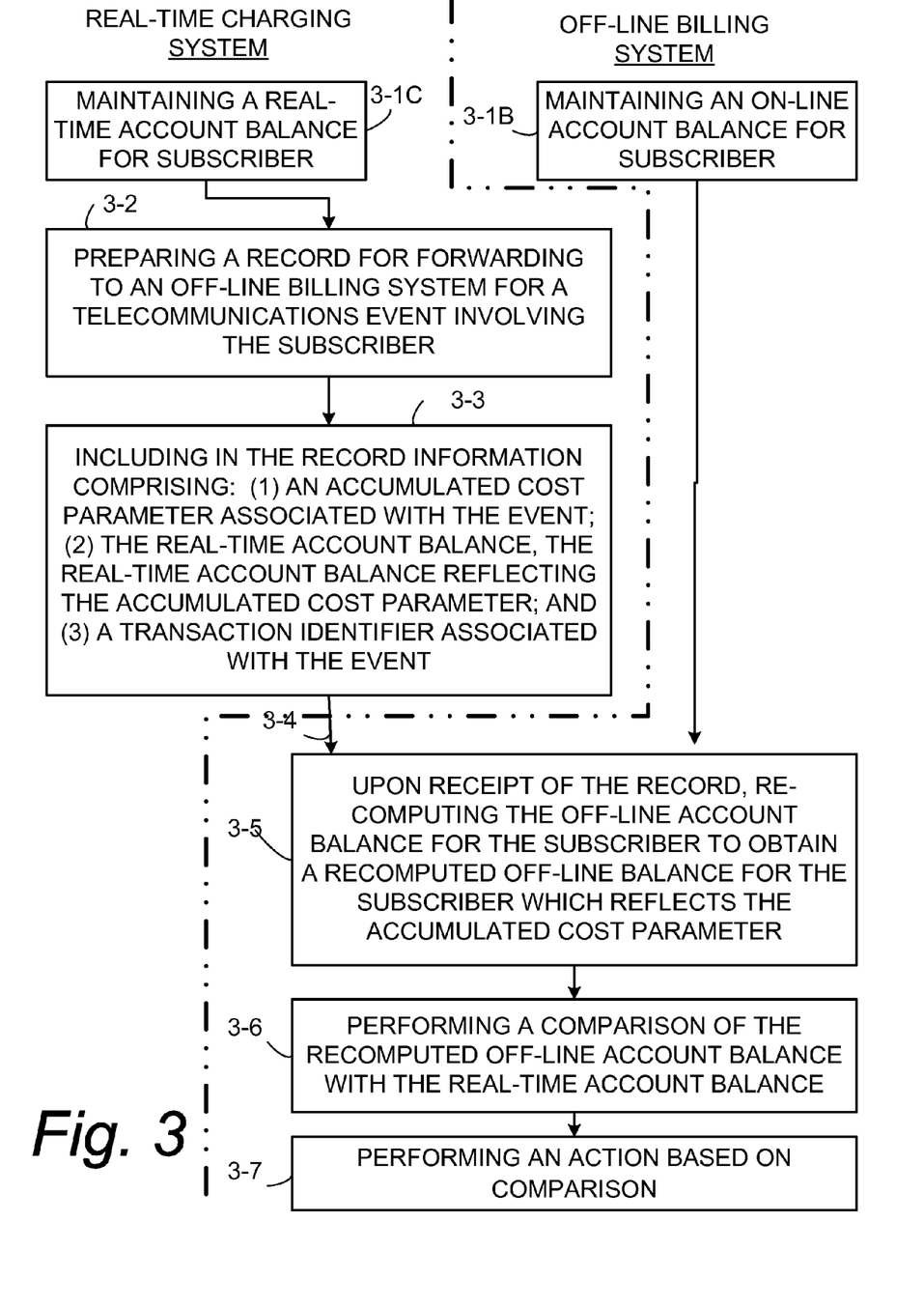
FIG. 3 is a flowchart showing example, representative, basic acts or steps of a method of operating a communications system having synchronized charging and billing.

Basic signaling flow involved in the synchronized charging and billing of the technology is basically shown in FIG. 1, and example, representative, basic acts or steps of a method of operating a communications system having synchronized charging and billing are depicted in FIG. 3. Acts performed by real-time charging system 22 and off-line billing system 24, respectively, are delineated in FIG. 3 by a dash double-dotted line.

Act 3-1B of FIG. 3 shows off-line billing system 24 maintaining an off-line account balance for a particular subscriber ("the" subscriber). The off-line account, indicated as off-line account 54 in FIG. 1, is maintained for the customer as a relatively permanent historical record of the subscriber's transactions. Act 3-1C of FIG. 3 shows the real-time charging system 22 maintaining a real-time account balance for a subscriber. The real-time account balance is stored in real-time account 34 as shown in FIG. 1. The real-time account 34 can also be relatively permanent, or can be temporary (existing only during the life or duration of an active transaction which is being serviced by real-time charging system 22). In the latter case, a balance for the real-time account 34 for the subscriber can be procured from other sources, e.g., such as from the off-line account 54 of the same subscriber, for example.

In set up of a basic connection or call (e.g., a transaction), the subscriber activates or uses his/her phone (for speech, SMS, or other service). As shown by act 1-1 of FIG. 1, a request is sent in real-time to real-time charging system 22 for credit/spending control to decide if usage is allowed. If usage is allowed, the real-time charging system 22 reserves money (or other appropriate units) and, as act 1-2, sends an acknowledgement back to communications system 20.

As usage of a communications service by the subscriber begins, initial charges and intermediate charges (intermediate charging instances) are incurred (e.g., periodically) during the usage. At end of usage a final charge (final charging instance), the communications transaction is completed.

After each intermediate and/or final charge a record 40 (e.g., a CDR) is produced in real-time charging system 22. Thus, act 3-2 of FIG. 3 and act 1-3 of comprises preparing a record for forwarding to off-line billing system 24 for a communications event involving the subscriber. As indicated previously and shown as act 3-3, preparation of the record 40 comprises including in the record, among other things, information comprising: (1) an accumulated cost parameter associated with the event; (2) the real-time account balance, the real-time account balance reflecting the accumulated cost parameter; and (3) a transaction identifier associated with the event. Arrow 3-4 of FIG. 3 and arrow 1-4 of FIG. 1 depict transmission or sending of the record 40 from real-time charging system 22 to off-line billing system 24 using an appropriate protocol for example a filed based protocol such as ftp or a realtime protocol such as DIAMETER.

Act 3-5 of FIG. 5 comprises off-line billing system 24, upon receipt of the record, re-computing the off-line account balance for the subscriber to obtain a recomputed off-line balance for the subscriber. The recomputed off-line balance for the subscriber reflects the accumulated cost parameter of the received record 40.

When enabled or authorized to perform a synchronization operation, as act 3-6 off-line billing system 24 performs a comparison of the recomputed off-line account balance with the real-time account balance. In the detailed embodiment of FIG. 2, the comparison can be performed by account checker 92.

Act 3-7 of FIG. 3 shows off-line billing system 24 providing a notification based on the comparison of act 3-6. The notification can result in one or more actions being performed, such as (for example) adjusting the balance of the real-time account; adjusting the balance of the off-line account; generating an alarm; and/or recording or relaying any discrepancy noted in the comparison to a log or other media.

Figure 4:
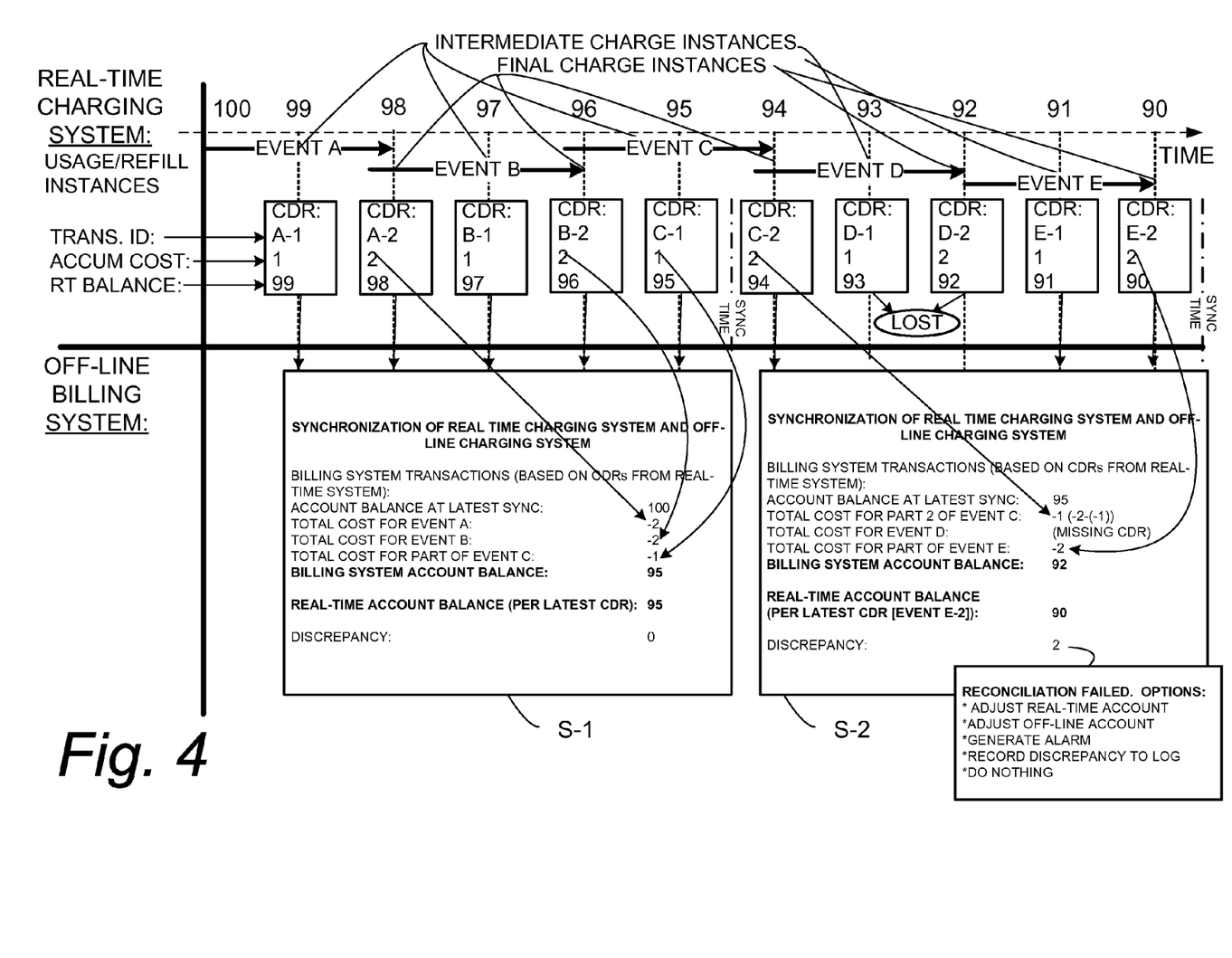
FIG. 4 is a diagrammatic view of a scenario involving a sequence of events handled by an example charging system and an example billing system in fulfilling the example method of FIG. 3.

FIG. 4 shows an example scenario involving a sequence of events handled by an example charging system and an example billing system in fulfilling the example method of FIG. 3. For each event that affects the real-time account balance for a subscriber, a record 40 is generated by real-time charging system 22 and sent to off-line billing system 24. FIG. 4 shows in particular five events for a subscriber, i.e., event A through and including event E. The horizontal axis of FIG. 4 denotes the passage of time. FIG. 4 utilizes and illustrates transaction identifiers (transaction IDs) which facilitate detection/relation of CDRs related to the same event or transaction. At the beginning of the time shown in FIG. 4, the subscriber is credited with 100 financial units in his real-time account 34. The off-line account 54 of the subscriber reflects the same initial balance of 100 financial units.

FIG. 4 further shows two charging instances for each event: an intermediate charging instance and a final charging instance. For example, event A has an intermediate charging instance (reported by a CDR having transaction ID A-1) and a final charging instance (reported by a CDR having transaction ID A-2). FIG. 4 further shows that the subscriber has a remaining real-time balance of 99 units at the intermediate charging instance reported by CDR A-1, and a remaining real-time balance of 98 units at the intermediate charging instance reported by CDR A-2. Likewise, event B has an intermediate charging instance (reported by a CDR having transaction ID B-1) and a final charging instance (reported by a CDR having transaction ID B-2). FIG. 4 further shows that the subscriber has a remaining real-time balance of 97 units at the intermediate charging instance reported by CDR B-1, and a remaining real-time balance of 96 units at the intermediate charging instance reported by CDR B-2. The charging instances and remaining balances are therefore understood with respect to each of the remaining events C, D, and E.

FIG. 4 shows example contents of a CDR type record 40 for each charging instance. The CDR records 40 of FIG. 4 are shown situated so that their information fields for transaction ID, accumulated cost, and real-time (RT) balance are aligned with one another and with labeling in the left margin.

The bottom half of FIG. 4 illustrates synchronization operation calculations performed by off-line billing system 24 for the scenario of FIG. 4. Block S-1 of FIG. 4 reflects synchronization operation calculations upon performance of a first synchronization operation; Block S-2 of FIG. 4 reflects synchronization operation calculations upon performance of a second synchronization operation. The first synchronization operation is performed as a result of occurrence of a first synchronization triggering circumstance (shown by a dotted-dashed line) which happens in the second half of event C. The second synchronization operation is performed as a result of occurrence of a second synchronization triggering circumstance, which occurs at a time after conclusion of event E (as shown by another dotted-dashed line at the right of FIG. 4). The synchronization triggering circumstance can be periodic, otherwise predetermined, and/or configurable by the operator.

The results of the first synchronization operation (shown in block S1 of FIG. 4) indicate that synchronization was confirmed. Indeed, at the first synchronization trigger the off-line billing system 24 has received each of CDRs A-1, A-2, B-1, B-2, and C-1, and for the events A, B, and C has thus far deducted 2 units, 2 units, and 1 unit, respectively. The off-line billing system 24 thus has for off-line account 54 a balance of 95 units. The number of 95 units is also indicated in the most recently received CDR record 40 (i.e., CDR C-1). Therefore, at the first synchronization time the off-line billing system 24 confirms synchronization of real-time account 34 and off-line account 54 for the subscriber.

The results of the second synchronization operation (shown in block S2 of FIG. 4) show a synchronization failure. Both CDR D-1 and CDR D-2 generated by real-time charging system 22 for event D were lost, e.g., not received by off-line billing system 24. In fact, the existence of CDR D-1 and CDR D-2 are unknown to off-line billing system 24. The off-line billing system 24 did receive CDR C-2 for event C and the two CDRs E-1 and E-2 for event E, and accordingly deducted 1 unit for event C and two units for event E, leaving a balance of 92 in the off-line account 54 as determined by off-line billing system 24. However, the most recently received CDR (i.e., CDR E-2) indicates that the real-time account balance for real-time account 34 as determined by real-time charging system 22 is 90 units. Comparison of the off-line account 54 (92 units) with the real-time account 34 (90 units) shows disagreement or discrepancy, indicating that one or more records 40 (e.g., CDRs) may have been lost.

In the case that the transaction IDs are uniquely assigned arranged in a predictable fashion such as by sequence, a lost packet detector 96 which optionally comprises off-line billing system 24 can be used to ascertain the record loss and determine how many records 40 were indeed lost. The lost packet detector 96 can check for gaps in the sequence of transaction IDs and thereby determine the occurrence and number of lost records.

Thus, at the time for synchronization, the total cost for all events since last synchronization is added to the saved account balance for the off-line account 54 after the previous synchronization. The sum of this calculation (which is now the content of off-line account 54) is compared to real-time account balance fetched from the most recently received CDR (which, among other things, holds the real-time account balance, sum of cost and Transaction ID) for latest event received in the offline system.

If calculated off-line account balance based on cost from CDRs is not equal to real-time account balance fetched from the CDR record 40 for latest event, the off-line billing system 24 can generate a notification (via responder 94) and further has the option to take any of several possible actions. For example, the off-line billing system 24 can, among other actions, adjustment the real-time account (e.g., real-time account 34) or the off-line account (e.g., off-line account 54) to obtain synchronization; generate an alarm, write an incident in a log, or do nothing.

Thus, when a CDR is lost, the real-time account 34 and the offline account 54 are out of synchronization. Since new data in the most recently received CDR is available, it is possible to detect that the accounts are out of synchronization and also to take one of the actions mentioned above. It is then possible to align the real-time credit/spending control with credit/spending amount on invoice/usage statement.

An advantage of the present technology is that a real-time account and an offline account for a subscriber can be synchronized at any time. This presents the possibility to combine real-time credit & spending control with itemized invoice or usage statement. The technology is applicable for both pre- and post-paid subscribers and is independent on the access method.

This technology also makes it possible to handle lost CDRs, re-rating, late incoming CDRs from roaming events, and still have the real-time account synchronized with the post-processing system used to generate itemized invoice/statement.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of operating a communications network comprising:
   in a real-time charging system:
      maintaining a real-time account balance for a subscriber;
      for a communications event involving the subscriber, preparing a record for forwarding to an off-line billing system;
      in the record including information comprising: (1) an accumulated cost parameter associated with the event; (2) the real-time account balance, the real-time account balance reflecting the accumulated cost parameter; and (3) a transaction identifier associated with the event;

at the billing system:
: maintaining an off-line account balance for the subscriber;
: upon receipt of the record, re-computing the off-line account balance for the subscriber to obtain a recomputed off-line balance for the subscriber which reflects the accumulated cost parameter;
: performing a comparison of the recomputed off-line account balance with the real-time account balance.

2. The method of claim 1, further comprising performing an action based on the comparison.

3. The method of claim 1, further comprising providing a notification action based on the comparison.

4. The method of claim 1, further comprising performing an adjustment of one of the off-line account balance and the real-time account balance.

5. The method of claim 1, further comprising recording or relaying any discrepancy noted in the comparison to a log or other media.

6. The method of claim 1, further comprising performing the comparison upon occurrence of predefined synchronization criteria.

7. The method of claim 1, further comprising:
the charging system preparing the transaction identifier in accordance with a predefined convention;
the billing system using the transaction identifier to ascertain loss of a previous record.

8. The method of claim 1, further comprising the billing system maintaining the off-line account balance as pre-paid account for the subscriber or as a post-paid account for the subscriber.

9. The method of claim 1, further comprising preparing the record upon occurrence of an intermediate charging instance of the event or a final charging instance of the event.

10. The method of claim 1, wherein both the off-line account balance and the real-time account balance are multi-event account balances for the subscriber, and wherein the acts of claim 1 are repeated for further events.

11. A node of a communications network comprising:
a database configured to maintain a real-time account balance for a subscriber;
a reporter unit configured, in conjunction with a communications event involving the subscriber, to prepare a record for forwarding to an off-line billing system, the record including information comprising: (1) an accumulated cost parameter associated with the event; (2) the real-time account balance, the real-time account balance reflecting the accumulated cost parameter; and (3) a transaction identifier associated with the event.

12. The apparatus of claim 11, wherein the report unit is configured to prepare the record upon occurrence of an intermediate charging instance of the event or a final charging instance of the event.

13. The apparatus of claim 11, wherein the reporter unit is configured to prepare the transaction identifier in accordance with a predefined convention which can be used to ascertain loss of a previous record.

14. The apparatus of claim 11, wherein the database is configured to maintain the real-time account balance as pre-paid account for the subscriber or as a post-paid account for the subscriber.

15. A node of a communications network comprising:
a database configured to maintain an off-line account balance for a subscriber;
a balance computer configured, upon receipt of a charging record, to re-compute the off-line account balance for the subscriber to obtain a recomputed off-line balance, the charging record including information comprising: (1) an accumulated cost parameter associated with a real-time communications event involving the subscriber; (2) a real-time account balance for the subscriber; and (3) a transaction identifier associated with the event;
an account checker configured to perform a comparison of the recomputed off-line account balance with the real-time account balance.

16. The apparatus of claim 15, further comprising a responder configured to perform an action based on comparison.

17. The apparatus of claim 16, wherein the action is a notification.

18. The apparatus of claim 15, further comprising a responder configured to provide a notification action based on the comparison.

19. The apparatus of claim 15, further comprising a responder configured to perform an adjustment of one of the off-line account balance and the real-time account balance based on the comparison.

20. The apparatus of claim 15, further comprising a responder configured to record or relay any discrepancy noted in the comparison to a log or other media.

21. The apparatus of claim 15, wherein the account checker is configured to perform the comparison upon occurrence of predefined synchronization criteria.

22. The apparatus of claim 15, further comprising a lost record detector configured to use the transaction identifier to ascertain loss of a previous record.

23. The apparatus of claim 15, wherein the database is configured to maintain the off-line account balance as pre-paid account for the subscriber or as a post-paid account for the subscriber.

* * * * *